(12) United States Patent
Izumikawa et al.

(10) Patent No.: US 8,014,325 B2
(45) Date of Patent: Sep. 6, 2011

(54) COMMUNICATION SCHEDULING METHOD FOR WIRELESS RELAY SYSTEMS

(75) Inventors: Haruki Izumikawa, Fujimino (JP); Kenji Saitou, Fujimino (JP); Keizou Sugiyama, Fujimino (JP)

(73) Assignee: KDDI Corporation, Tokyo (JP)

( * ) Notice: Subject to any disclaimer, the term of this patent is extended or adjusted under 35 U.S.C. 154(b) by 948 days.

(21) Appl. No.: 11/645,512

(22) Filed: Dec. 27, 2006

(65) Prior Publication Data
US 2007/0147341 A1 Jun. 28, 2007

(30) Foreign Application Priority Data
Dec. 28, 2005 (JP) .................................. 2005-378252

(51) Int. Cl.
*H04B 7/00* (2006.01)
(52) U.S. Cl. ..... 370/310; 455/509; 455/450; 455/67.13; 455/9; 370/365; 370/315; 370/316; 370/326; 370/329; 370/330
(58) Field of Classification Search .................. 455/509, 455/450, 67.13, 63.1, 9; 370/465, 315, 316, 370/365, 310, 326, 329, 330
See application file for complete search history.

(56) References Cited

U.S. PATENT DOCUMENTS
| | | | | |
|---|---|---|---|---|
| 6,584,080 B1 * | 6/2003 | Ganz et al. | ..................... | 370/315 |
| 6,690,657 B1 | 2/2004 | Lau et al. | | |
| 7,326,025 B2 * | 2/2008 | Viluan et al. | ................... | 414/676 |
| 7,643,790 B2 | 1/2010 | Jang et al. | | |
| 2004/0102219 A1 * | 5/2004 | Bunton et al. | ................ | 455/560 |
| 2005/0003856 A1 | 1/2005 | Jang et al. | | |
| 2005/0272366 A1 * | 12/2005 | Eichinger et al. | ................ | 455/9 |
| 2006/0014491 A1 * | 1/2006 | Cleveland | ........................ | 455/17 |
| 2006/0040611 A1 * | 2/2006 | Ding et al. | .................... | 455/509 |
| 2009/0141668 A1 * | 6/2009 | Zhang et al. | .................. | 370/315 |

FOREIGN PATENT DOCUMENTS
JP 2002-538640 A 11/2002
JP 2004-364308 A 12/2004

OTHER PUBLICATIONS

Part 16: Air Interface for Fixed Broadband Wireless Access Systems, IEEE Standard for local and metropolitan area networks, Oct. 1, 2004, 893 pgs., 802.16, New York, NY, USA.
Japanese Office Action dated Feb. 16, 2011, issued in correspoinding Japanese Patent Application No. 2005-378252.

* cited by examiner

*Primary Examiner* — Nimesh Patel
(74) *Attorney, Agent, or Firm* — Westerman, Hattori, Daniels & Adrian, LLP (57) ABSTRACT

In the P-MP wireless data communication via relay stations, a wireless base station forms a communication schedule between the relay station and the relay station and a communication schedule between the relay station and the subscriber station. For each subscriber station (SS), a connected station, an interference at downloading, an interference at uploading, a burst profile between the BS and the SS, and a burst profile between the RS and the SS are registered in an SS management table of the BS. An interference during downloading is generated by allowing each SS to send an identifier of a BS or an RS acting as an interference to a BS to which the SS is connected. An interference during uploading is generated by allowing the BS to capture ranging fixed at the starting time and the like from an SS being under the control of the RS.

5 Claims, 9 Drawing Sheets

| ADDRESS | SUBSCRIBER STATION (SS) | CONNECTED STATION | INTERFERENCE AT DOWNLOADING | INTERFERENCE AT UPLOADING | BURST PROFILE (BS-SS) | BURST PROFILE (RS-SS) |
|---|---|---|---|---|---|---|
| 1 | SS1 | BS | — | RS1 | X | — |
| 10 | SS2 | BS | — | RS2 | Y | — |
| 15 | SS11 | RS1 | — | — | Z | Y |
| 28 | SS12 | RS1 | RS2 | RS2 | Z | Y |
| 33 | SS21 | RS2 | — | — | Z | Y |
| 40 | SS22 | RS2 | BS | BS | Z | Y |

SS CONTROL TABLE

| ADDRESS | SUBSCRIBER STATION (SS) | CONNECTED STATION | INTERFERENCE AT DOWNLOADING | INTERFERENCE AT UPLOADING | BURST PROFILE (BS-SS) | BURST PROFILE (RS-SS) |
|---|---|---|---|---|---|---|
| 1 | SS1 | BS | — | RS1 | X | — |
| 10 | SS2 | BS | — | RS2 | Y | — |
| 15 | SS11 | RS1 | — | — | Z | Y |
| 28 | SS12 | RS1 | RS2 | RS2 | Z | Y |
| 33 | SS21 | RS2 | — | — | Z | Y |
| 40 | SS22 | RS2 | BS | BS | Z | Y |

SS CONTROL TABLE

Fig. 4

| ADDRESS | SUBSCRIBER STATION (SS) | CONNECTED STATION | INTERFERENCE AT DOWNLOADING | INTERFERENCE AT UPLOADING | BURST PROFILE (RS-) |
|---|---|---|---|---|---|
| 1 | RS1 | BS | RS2 | RS2 | Z |
| 10 | RS2 | BS | RS1 | RS1 | Z |

RS CONTROL TABLE

| SERVICE CLASS | URGENCY | SCHEDULING CONDITION |
|---|---|---|
| UGS | HIGH | (CURRENT TIME−QUEUING TIME)+NUMBER OF HOPS×WIRELESS FRAME LENGTH > D_ugs |
| UGS | LOW | A PACKET IS PRESENT IN A QUEUE |
| rtPS | HIGH | (CURRENT TIME−QUEUING TIME)+NUMBER OF HOPS×WIRELESS FRAME LENGTH > D_rtPS |
| rtPS | LOW | A PACKET IS PRESENT IN A QUEUE |
| nrtPS | HIGH | THE TRANSMISSION RATE DOSE NOT EXCEED THE GUARANTEE RATE EVEN IF A PACKET IS TRANSMITTED |
| nrtPS | LOW | A PACKET IS PRESENT IN A QUEUE |
| BE | | A PACKET IS PRESENT IN A QUEUE |

| TIMING | DESTI-NATION 1 | CONNECTED STATION 1 | INTER-FERENCE 1 | DESTI-NATION 2 | CONNECTED STATION 2 | INTER-FERENCE 2 | DESTI-NATION N |
|---|---|---|---|---|---|---|---|
| T_1 | SS12 | RS1 | RS2 | — | — | — | ... |
| T_2 | SS21 | RS2 | — | SS11 | RS1 | — | ... |
| T_3 | SS22 | RS2 | BS | — | — | — | ... |
| T_4 | RS1 (SS11) | BS | RS2 | — | — | — | ... |

(b)

| TIMING | DESTI-NATION 1 | CONNECTED STATION 1 | INTER-FERENCE 1 | DESTI-NATION 2 | CONNECTED STATION 2 | INTER-FERENCE 2 | DESTI-NATION 3 | CONNECTED STATION 3 | INTER-FERENCE 3 |
|---|---|---|---|---|---|---|---|---|---|
| T_1 | SS12 | RS1 | RS2 | — | — | — | — | — | — |
| T_2 | SS21 | RS2 | — | SS11 | RS1 | — | — | — | — |
| T_3 | SS22 | RS2 | BS | — | — | — | — | — | — |
| T_4 | RS1 (SS11) | BS | RS2 | — | — | — | — | — | — |
| ... | ... | ... | ... | ... | ... | ... | ... | ... | ... |

(c)

| TIMING | DESTI-NATION 1 | CONNECTED STATION 1 | INTER-FERENCE 1 | DESTI-NATION 2 | CONNECTED STATION 2 | INTER-FERENCE 2 | DESTI-NATION 3 | CONNECTED STATION 3 | INTER-FERENCE 3 |
|---|---|---|---|---|---|---|---|---|---|
| T_1 | SS12 | RS1 | RS2 | — | — | — | — | — | — |
| T_2 | SS21 | RS2 | — | SS11 | RS1 | — | — | — | — |
| T_3 | SS22 | RS2 | BS | — | — | — | — | — | — |
| T_4 | RS1 (SS11) | BS | RS2 | — | — | — | — | — | — |
| T_5 | RS1 (SS12) | BS | RS2 | ... | ... | ... | ... | ... | ... |
| — | — | — | — | — | — | — | — | — | — |

(d)

| TIMING | DESTI-NATION 1 | CONNECTED STATION 1 | INTER-FERENCE 1 | DESTI-NATION 2 | CONNECTED STATION 2 | INTER-FERENCE 2 | DESTI-NATION 3 | CONNECTED STATION 3 | INTER-FERENCE 3 |
|---|---|---|---|---|---|---|---|---|---|
| T_1 | SS12 | RS1 | RS2 | RS2 (SS22) | BS | RS1 | — | — | — |
| T_2 | SS21 | RS2 | — | SS11 | RS1 | — | — | — | — |
| T_3 | SS22 | RS2 | BS | — | — | — | — | — | — |
| T_4 | RS1 (SS11) | BS | RS2 | — | — | — | — | — | — |
| T_5 | RS1 (SS12) | BS | RS2 | ... | ... | ... | ... | ... | ... |
| — | — | — | — | — | — | — | — | — | — |

| TIMING | DESTI-NATION 1 | CONNECTED STATION 1 | INTER-FERENCE 1 | DESTI-NATION 2 | CONNECTED STATION 2 | INTER-FERENCE 2 | DESTI-NATION 3 | CONNECTED STATION 3 | INTER-FERENCE 3 |
|---|---|---|---|---|---|---|---|---|---|
| T_1 | SS12 | RS1 | RS2 | RS2 (SS22) | BS | RS1 | — | — | — |
| T_2 | SS21 | RS2 | — | SS11 | RS1 | — | — | — | — |
| T_3 | SS22 | RS2 | BS | — | — | — | — | — | — |
| T_4 | RS1 (SS11) | BS | RS2 | — | — | — | — | — | — |
| T_5 | RS1 (SS12) | BS | RS2 | ... | ... | ... | ... | ... | ... |
| T_6 | RS2 (SS21) | BS | RS1 | — | — | — | — | — | — |

(f)

| TIMING | DESTI-NATION 1 | CONNECTED STATION 1 | INTER-FERENCE 1 | DESTI-NATION 2 | CONNECTED STATION 2 | INTER-FERENCE 2 | DESTI-NATION 3 | CONNECTED STATION 3 | INTER-FERENCE 3 |
|---|---|---|---|---|---|---|---|---|---|
| T_1 | SS12 | RS1 | RS2 | RS2 (SS22) | BS | RS1 | — | — | — |
| T_2 | SS21 | RS2 | — | SS11 | RS1 | — | SS2 | BS | — |
| T_3 | SS22 | RS2 | BS | — | — | — | — | — | — |
| T_4 | RS1 (SS11) | BS | RS2 | — | — | — | — | — | — |
| T_5 | RS1 (SS12) | BS | RS2 | ... | ... | ... | ... | ... | ... |
| T_6 | RS2 (SS21) | BS | RS1 | — | — | — | — | — | — |

(g)

| TIMING | DESTI-NATION 1 | CONNECTED STATION 1 | INTER-FERENCE 1 | DESTI-NATION 2 | CONNECTED STATION 2 | INTER-FERENCE 2 | DESTI-NATION 3 | CONNECTED STATION 3 | INTER-FERENCE 3 |
|---|---|---|---|---|---|---|---|---|---|
| T_1 | SS12 | RS1 | RS2 | RS2 (SS22) | BS | RS1 | — | — | — |
| T_2 | SS21 | RS2 | — | SS11 | RS1 | — | SS2 | BS | — |
| T_3 | SS22 | RS2 | BS | — | — | — | — | — | — |
| T_4 | RS1 (SS11) | BS | RS2 | — | — | — | — | — | — |
| T_5 | RS1 (SS12) | BS | RS2 | ... | ... | ... | ... | ... | ... |
| T_6 | RS2 (SS21) | BS | RS1 | — | — | — | — | — | — |
| T_7 | SS1 | BS | — | — | — | — | — | — | — |

| TIMING | DESTI-NATION 1 | CONNECTED STATION 1 | INTER-FERENCE 1 | DESTI-NATION 2 | CONNECTED STATION 2 | INTER-FERENCE 2 | DESTI-NATION 3 | CONNECTED STATION 3 | INTER-FERENCE 3 |
|---|---|---|---|---|---|---|---|---|---|
| T_11 | SS11 | RS1 | — | — | — | — | ... | — | — |
| — | — | — | — | — | — | — | ... | — | — |
| — | — | — | — | — | — | — | ... | — | — |

(b)

| TIMING | DESTI-NATION 1 | CONNECTED STATION 1 | INTER-FERENCE 1 | DESTI-NATION 2 | CONNECTED STATION 2 | INTER-FERENCE 2 | DESTI-NATION 3 | CONNECTED STATION 3 | INTER-FERENCE 3 |
|---|---|---|---|---|---|---|---|---|---|
| T_11 | SS11 | RS1 | — | — | — | — | ... | — | — |
| T_12 | SS12 | RS1 | RS2 | — | — | — | ... | — | — |
| — | — | — | — | — | — | — | ... | — | — |
| — | — | — | — | — | — | — | ... | — | — |

(c)

| TIMING | DESTI-NATION 1 | CONNECTED STATION 1 | INTER-FERENCE 1 | DESTI-NATION 2 | CONNECTED STATION 2 | INTER-FERENCE 2 | DESTI-NATION 3 | CONNECTED STATION 3 | INTER-FERENCE 3 |
|---|---|---|---|---|---|---|---|---|---|
| T_11 | SS11 | RS1 | — | SS22 | RS2 | BS | ... | — | — |
| T_12 | SS12 | RS1 | RS2 | — | — | — | ... | — | — |
| — | — | — | — | — | — | — | ... | — | — |
| — | — | — | — | — | — | — | ... | — | — |

(d)

| TIMING | DESTI-NATION 1 | CONNECTED STATION 1 | INTER-FERENCE 1 | DESTI-NATION 2 | CONNECTED STATION 2 | INTER-FERENCE 2 | DESTI-NATION 3 | CONNECTED STATION 3 | INTER-FERENCE 3 |
|---|---|---|---|---|---|---|---|---|---|
| T_11 | SS11 | RS1 | — | SS22 | RS2 | BS | ... | — | — |
| T_12 | SS12 | RS1 | RS2 | — | — | — | ... | — | — |
| T_13 | SS21 | RS2 | — | — | — | — | ... | — | — |
| — | — | — | — | — | — | — | ... | — | — |
| ... | ... | ... | ... | ... | ... | ... | ... | ... | ... |

COMMUNICATION SCHEDULING METHOD FOR WIRELESS RELAY SYSTEMS

BACKGROUND OF THE INVENTION

1. Field of the Invention

This invention relates to a communication scheduling method suitable for P-MP (i.e., Point-to-Multipoint) wireless data communication via relay stations.

2. Description of the Related Art

A process for assigning transmission opportunities is called "scheduling." In a FIFO (First In First Out) which is the simplest algorithm, only one queue is prepared for all flows, and input packets are queued in order of arrival, and are scheduled in this order. In other words, a packet that has arrived earlier than the others is output earlier. However, in the FIFO, real-time traffic, such as that in telephone communication or video communication, which is strict about time, and non-real-time traffic, such as that in file transfer, web browsing, or E-mail transmission, are queued in a mixed state, thus making it difficult to guarantee QoS (i.e., Quality of Service).

A non-patent document 1 (IEEE Standard for Local and metropolitan area networks-Part 16: Air Interface for Fixed Broadband Wireless Access Systems, IEEE 802.16-2004, October, 2004) discloses a high-speed wireless access system that is called "IEEE802.16" (hereinafter, referred to simply as "802.16"), by which a QoS control function is supported. Latency, jitter, traffic rate, etc., of packets can be mentioned as QoS parameters in the "802.16." These parameters are guaranteed between base stations or between a base station and a subscriber station, not between end users. In other words, for example, in a downlink, Latency or jitter to be guaranteed is the one that occurs until a packet is sent to a subscriber station after a base station receives this packet. The "802.16" does not have an especially specified scheduling algorithm.

The "802.16" can fulfill a QoS guarantee, but does not disclose a detailed scheduling algorithm for the guarantee. Therefore, the "802.16" is required to have a scheduling algorithm that enables such a QoS guarantee. Additionally, to achieve a multihop network in which the "802.16" is wirelessly relayed, a scheduling method taking relays into consideration must be established.

SUMMARY OF THE INVENTION

It is an object of the present invention to provide a communication scheduling method according to which, in the P-MP wireless data communication via relay stations, a wireless base station can form not only a communication schedule between the wireless base station and the relay station but also a communication schedule between the relay station and the relay station or a communication schedule between the relay station and the subscriber station.

To achieve the object, the present invention is characterized by including the following steps in a communication scheduling method for a packet switching network including a wireless base station, a wireless relay station, and a plurality of subscriber stations for allowing the wireless base station and each subscriber station to perform packet switching via relay stations.

(1) The communication scheduling method includes a step of allowing the wireless base station to detect an interference at downloading from the wireless base station to the wireless relay station and to the subscriber stations; a step of allowing the wireless base station to detect an interference at uploading from the wireless relay station and from the subscriber stations to the wireless base station; a step of allowing the wireless base station to, based on detected interference information, form a communication schedule between the wireless base station and the wireless relay station, between the wireless relay station and the subscriber station and between the wireless base station and the subscriber station; a step of transmitting a frame in which a MAP of the communication schedule has been included from the wireless base station to the wireless relay station and the subscriber station; a step of allowing the wireless relay station and the subscriber station to receive a frame in which the communication schedule has been included; and a step of transmitting the frame in which the MAP of the communication schedule has been included from the wireless relay station that has received the frame in which the communication schedule has been included to the subscriber station.

According to the feature (1), the wireless base station can obtain interference information from the subscriber station and the wireless relay station, and hence can form not only a communication timing between the wireless base station and the relay station but also a communication timing between the wireless base stations and a communication timing between the relay station and the subscriber station without causing interference.

DETAILED DESCRIPTION OF THE PREFERRED EMBODIMENTS

Figure 1:
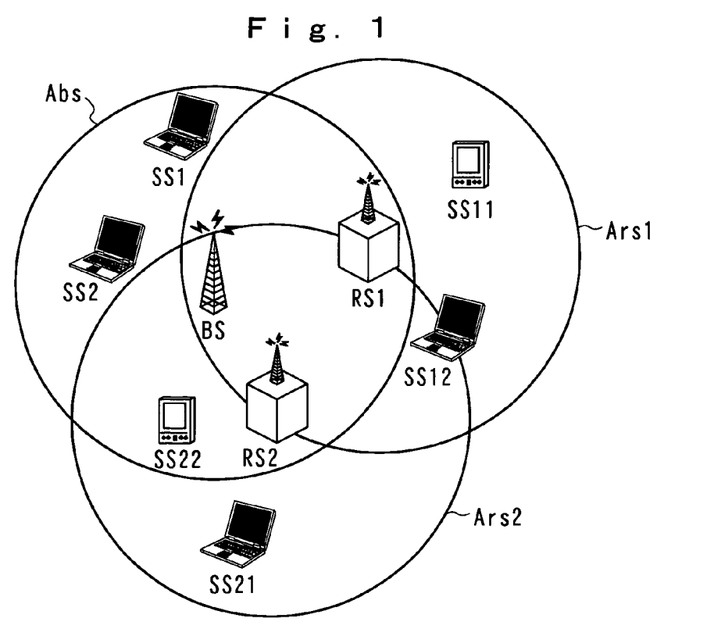
FIG. 1 shows coverage areas of a BS (base station) and of RSs (relay stations).
Figure 2:
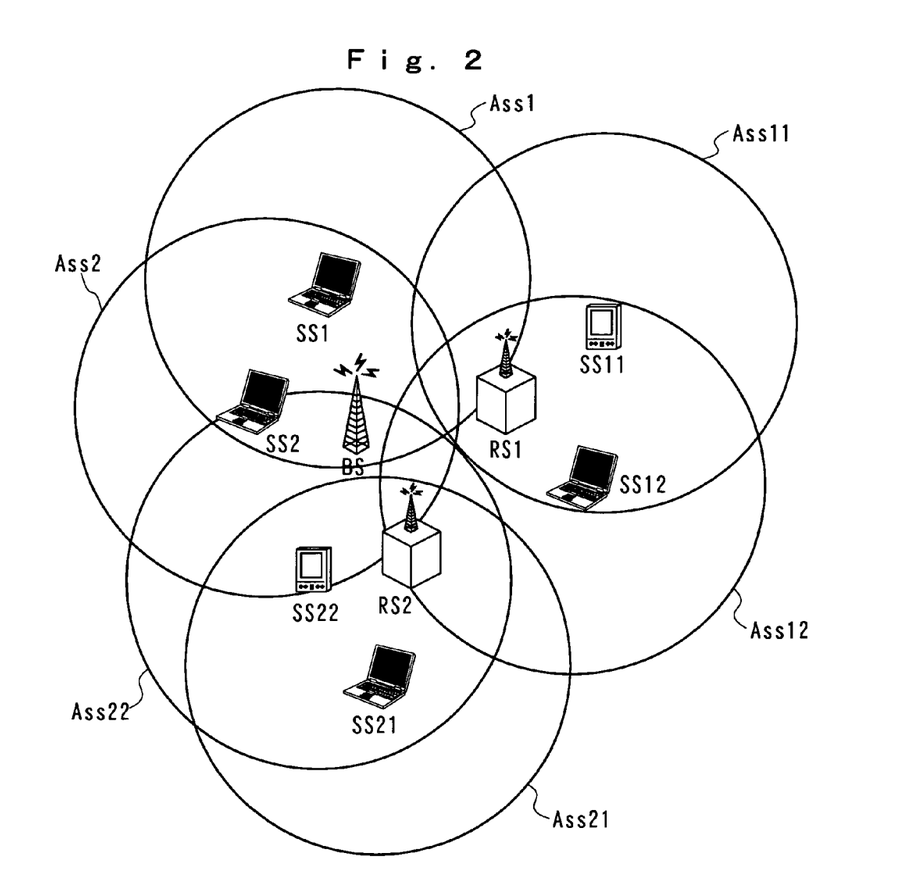
FIG. 2 shows coverage areas of SSs (subscriber stations).

The best mode for carrying out the present invention will be hereinafter described in detail with reference to the accompanying drawings. FIG. 1 and FIG. 2 show a network structure of a wireless network system to which a packet scheduling method of the present invention is applied.

FIG. 1 shows coverage areas of a wireless base station (hereinafter, referred to simply as "BS") and wireless relay stations (hereinafter, referred to simply as "RS"), in which a coverage area Abs of the BS is overlapped with coverage areas Ars1 and Ars2 of the RS1 and the RS2. FIG. 2 shows coverage areas of subscriber stations (hereinafter, referred to simply as "SS"), in which coverage areas Ass1, Ass2, etc., of the SS1, the SS2, etc., are overlapped with each other.

When an SS is connected to a BS or an RS, information about other BSs or RSs to which the SS is not connected is sent to the BS according to a predetermined procedure. At this time, for example, an original message based on ranging requirements (RNG-REQ) including MAC addresses or BSIDs (i.e., identifiers of BSs) of other BSs and/or RSs acting as an interference is sent to the BS, whereby the BS can recognize BSs and/or RSs acting as an interference with respect to the SS. Further, a BS and/or an RS can recognize SS which is not connected to the BS and/or the RS but radio waves emitted from which have reached the BS and/or the RS by capturing ranging requirements or the like.

Figure 3:
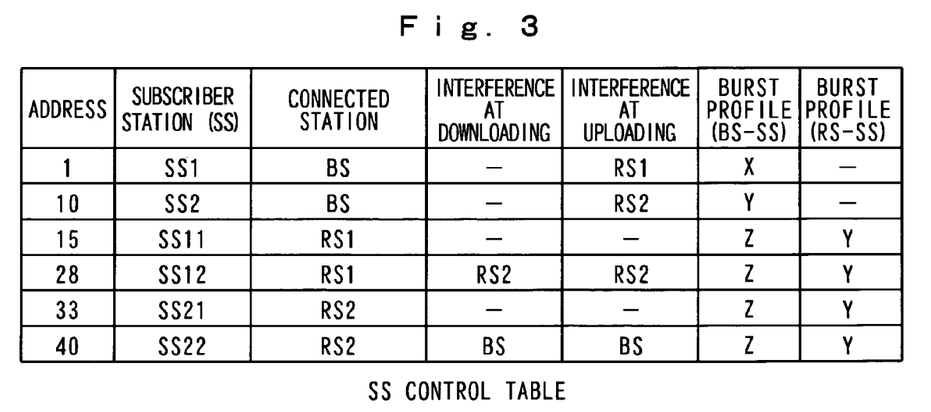
FIG. 3 shows an example of an SS management table controlled by the BS.

FIG. 3 shows an example of an SS management table generated in the BS based on a result of communication with each SS with respect to the positional relationship shown in FIG. 1 and FIG. 2. Factors registered in the SS management table are, for each SS, destinations to which each SS is directly connected, interferences that occur during downloading (i.e., during packet reception by each SS), interferences that occur during uploading (i.e., during packet transmission by each SS), burst profiles concerning the BS-to-SS (i.e., a set of parameter values, such as a modulation type or an FEC coding type, which are determined by, for example a CINR (carrier-to-noise-plus-interference ratio) between the BS and each SS), and burst profiles concerning the RS-to-SS.

In the SS management table, an interference that occurs during downloading is generated by allowing each SS to send identifiers (MAC addresses or IDs) of BSs or RSs acting as an interference to a BS that is a to-be-connected destination. Each SS recognizes a BS or an RS that may act as an interference by hearing a broadcast message from the BS or the RS. In more detail, when a to-be-connected BS or a to-be-connected RS is first determined, each SS confirms various broadcast messages sent from BSs or RSs over several frames, and, at this time, recognizes a BS or an RS excluding the to-be-connected BS or the to-be-connected RS as an interference. When each SS is moved, a search process, such as that mentioned above, is regularly performed.

On the other hand, concerning an interference that occurs during uploading, a BS directly captures ranging or the like from an SS, or a BS captures ranging fixed at starting time or the like from an SS attached to an RS, or an RS captures ranging or the like from an SS not attached to the RS and then sends a list thereof to a BS. As a result, the BS can recognize a group of SSs that may cause interference during uploading.

For example, the RS1, as well as the BS to which the SS1 is directly connected, is positioned in the coverage area Ass1 of the SS1 shown in FIG. 2, and there is a possibility that interference with the RS1 will be caused during uploading from the SS1 to the BS. Therefore, in the SS management table of FIG. 3, the "RS1" is registered as an interference that may occur during uploading from the SS1 thereto. However, as shown in FIG. 1, the SS1 is positioned outside both the coverage area Ars1 of the RS1 and the coverage area Ars2 of the RS2, and there exists no station that causes interference during downloading from the BS to the SS1. Therefore, in the SS management table of FIG. 3, an interference that occurs during downloading to the SS1 is unregistered.

Likewise, the RS2, as well as the BS to which the SS2 is directly connected, is positioned in the coverage area Ass2 of the SS2 shown in FIG. 2, and there is a possibility that interference with the RS2 will be caused during the uploading from the SS2 to the BS. Therefore, in the SS management table of FIG. 3, the "RS2" is registered as an interference that occurs during uploading from the SS2 thereto. However, as shown in FIG. 1, the SS2 is positioned outside both the coverage area Ars1 of the RS1 and the coverage area Ars2 of the RS2, and there exists no master station that causes interference during downloading from the BS to the SS2. Therefore, in the SS management table of FIG. 3, an interference that occurs during downloading to the SS2 is unregistered.

Likewise, the RS2, as well as the RS1 to which the SS12 is directly connected, is positioned in the coverage area Ass12 of the SS12 shown in FIG. 2, and there is a possibility that interference with the RS2 will be caused during the uploading from the SS12 to the RS1. Therefore, in the SS management table of FIG. 3, the "RS2" is registered as an interference that occurs during uploading from the SS12 to the RS1. Additionally, as shown in FIG. 1, the SS12 is positioned not only in the coverage area Ars1 of the RS1 but also in the coverage area Ars2 of the RS2, and hence there is a possibility that interference with the RS2 will be caused during the downloading from the RS1 to the SS12. Therefore, in the SS management table of FIG. 3, the "RS2" is registered as an interference that occurs during downloading to the SS12.

Figure 4:
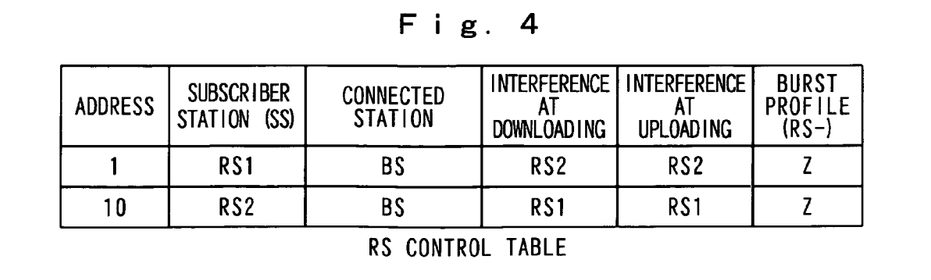
FIG. 4 shows an example of an RS management table controlled by the BS.

FIG. 4 shows an example of an RS management table generated in the BS in FIG. 1 and FIG. 2. Factors registered in this RS management table are, for each RS, destinations to which each RS is directly connected, interferences that occur during downloading (i.e., during packet reception by each RS), interferences that occur during uploading (i.e., during packet transmission by each RS), and burst profiles during communication with the BS, in the same way as in FIG. 3.

Figure 5:
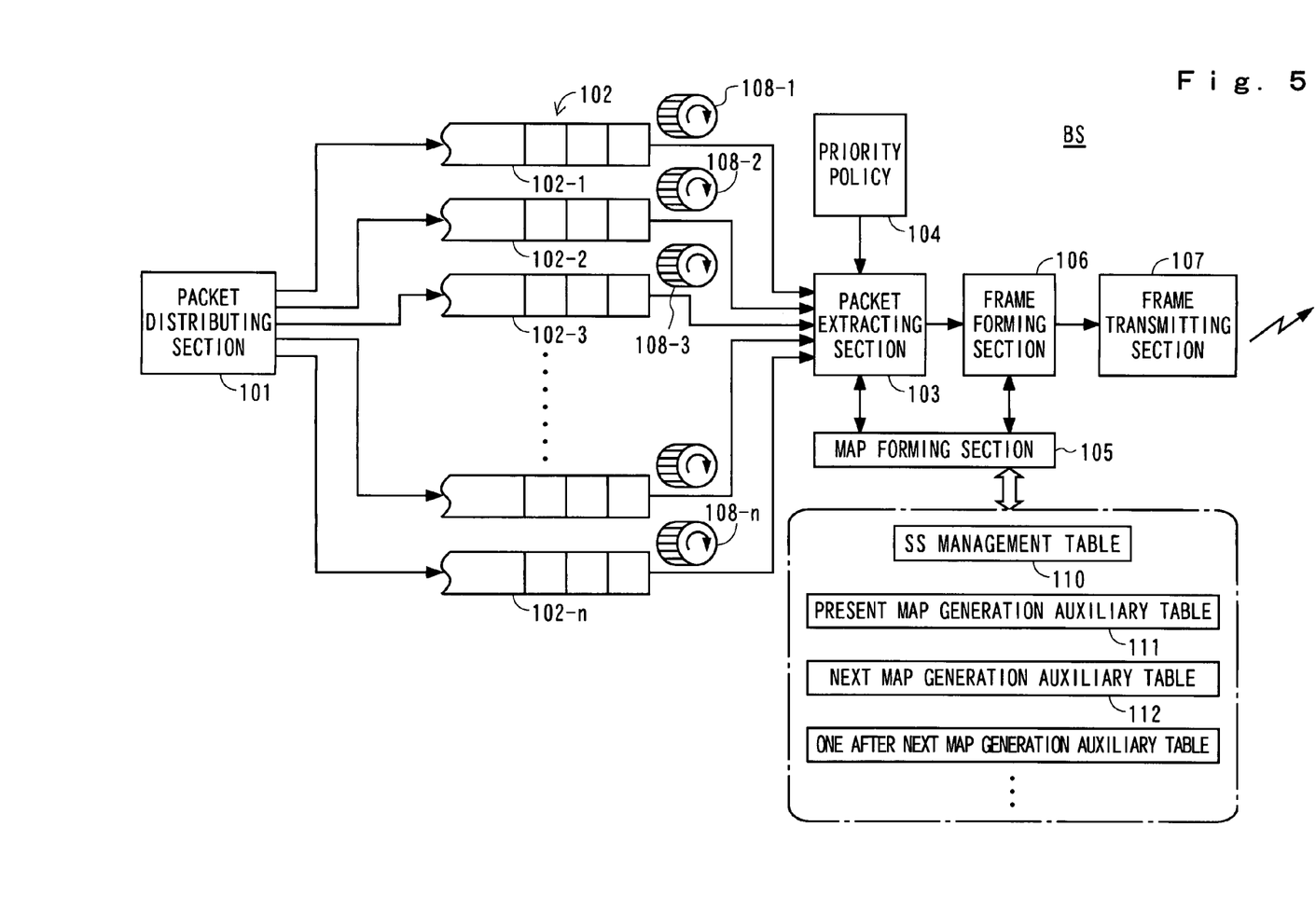
FIG. 5 is a functional block diagram showing a structure of a main part of the BS.

FIG. 5 is a functional block diagram showing a structure of a main part of a BS to which the present invention is applied. Herein, elements unnecessary to describe the present invention are not shown.

A packet distributing section 101 enques packets destined to SS received by the BS into its respective queues 102 (102-1, 102-2, ..., 102-$n$) in accordance with their service classes. Each queue 102 has a queue table 108 (108-1, 108-2, ..., 108-$n$) by which a destination, a packet size, queuing time, etc., of a queued packet are managed.

Based on a priority policy 104 described in detail later, a packet extracting section 103 selectively extracts a head packet of each queue 102 and gives a scheduling opportunity to this packet so that a scheduling opportunity of a packet passing through a relay station is prioritized over a scheduling opportunity of a packet not passing therethrough by the number of frames corresponding to the number of relay stations through which the packet has passed, and, as a result, a delay caused by passing through relay stations is compensated.

A MAP forming section 105 generates a MAP that controls the transmission timing of a packet to be transmitted by an n-th frame ("-th" is a suffix used to form ordinal numbers), based on the SS management table 110, the present MAP generation auxiliary table 111 described in detail later, the next MAP generation auxiliary table 112 described in detail later, etc. A frame forming section 106 forms a frame at which a plurality of packets extracted by the packet extracting section 103 are registered together with the MAP by which the transmission timings of these packets are determined. A frame transmitting section 107 transmits a frame at which the MAP and the packets are registered.

An RS or an SS that has received a frame recognizes a transmission timing (time slot) at which a packet is transmitted from a BS to this station (i.e., the RS or the SS) while referring to a MAP in the frame, and receives the packet. If a transmission timing at which a packet is transmitted from the RS to another RS or a SS attached to the RS is specified by the MAP, the RS that has received the frame recognizes this timing, and transmits a packet to the RS or the SS placed under the control thereof at this timing.

Figure 6:
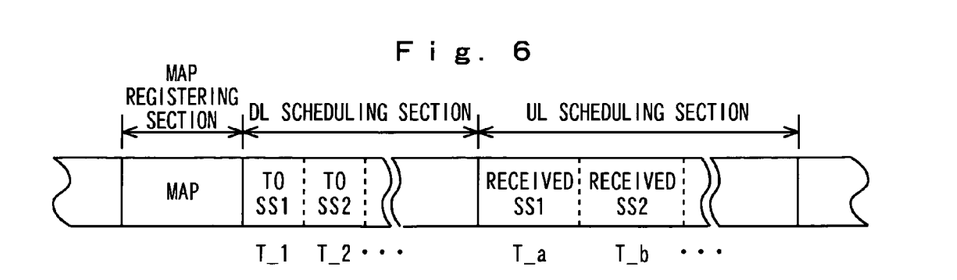
FIG. 6 shows a structure of a main part of a frame.

FIG. 6 is a schematic view showing a structure of a main part of a frame formed by the frame forming section 106. A MAP formed by the MAP forming section 105 is registered in a MAP registering section. This MAP registers a schedule in which transmitting times T_1 and T_2 of a packet destined to an SS or a packet destined to RS registered in a DL scheduling section of the frame or receiving times T_a and T_b of a UL packet registered in a UL scheduling section are set.

Figure 7:
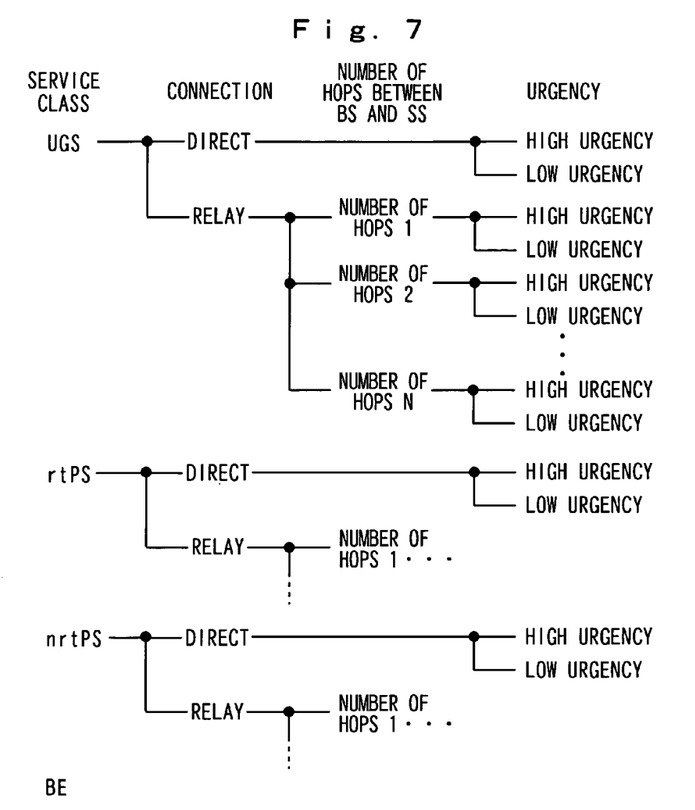
FIG. 7 shows the classification of service classes.

FIG. 7 shows a classification of service classes given to each flow in this embodiment, in which a plurality of service classes are prepared, and a queue is provided for each service class. Herein, in order from a service class having a high priority, the classification is made into four service classes, i.e., UGS (unsolicited grant service), rtPS (real-time polling service), nrtPS (non-real-time polling service), and BE (Best Effort), in the same way as in the "IEEE802.16." Each of the service classes "UGS," "rtPS," and "nrtPS" is further classified according to whether a connection with an SS is made directly or is made via an RS. One of the service classes in which a connection therewith is in the "relay" manner (i.e., is made via an RS) is further classified by the number of hops between a BS and an SS, and is further classified into a sub-class having high urgency and a sub-class having low urgency.

The "UGS" class includes a flow consisting of fixed-length packets that are transmitted at equal intervals of time, such as a T1/E1 line or VoIP. The "rtPS" class includes a flow consisting of variable-length packets that are transmitted at equal intervals of time, such as an MPEG video. The "nrtPS" class includes a flow that has a delay tolerance as in FTP and that is required to have the lowest traffic rate. The "BE" class includes a flow that is basically delivered by an empty slot without using any "QoS." Jitter, Latency, and traffic rates can be mentioned as QoS parameters in the UGS. Latency and traffic rates can be mentioned as QoS parameters in the rtPS. Traffic rates can be mentioned as QoS parameters in the nrtPS.

Figure 8:
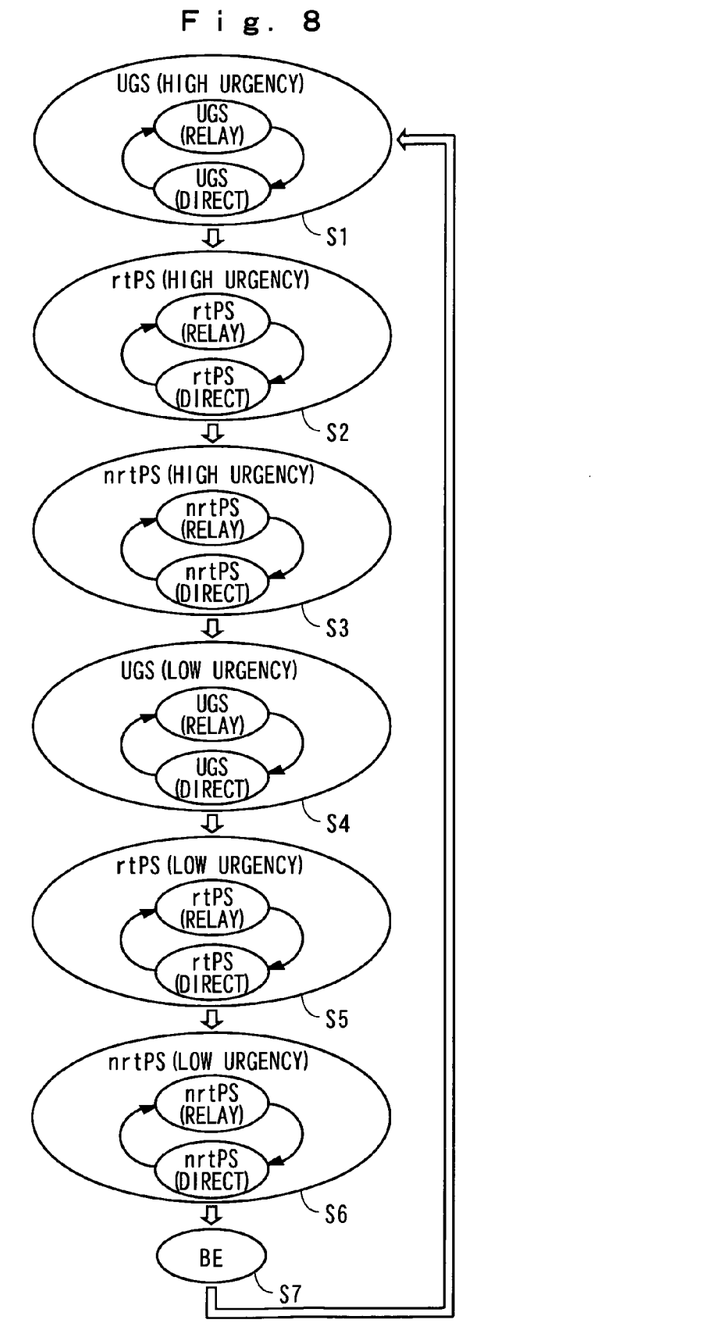
FIG. 8 is a schematic view showing a scheduling procedure of packet transmission in the BS.

FIG. 8 is a schematic view showing a scheduling procedure of packet transmission in a BS, which is executed by the packet extracting section 103 based on the priority policy 104.

At step S1, a scheduling opportunity is given to a packet of a queue assigned to a flow that has the service class "UGS" and the sub-class "high urgency." At step S2, a scheduling opportunity is given to a packet of a queue assigned to a flow that has the service class "rtPS" and the sub-class "high urgency." At step S3, a scheduling opportunity is given to a packet of a queue assigned to a flow that has the service class "nrtPS" and the sub-class "high urgency."

Likewise, at step S4, a scheduling opportunity is given to a packet of a queue assigned to a flow that has the service class "UGS" and the sub-class "low urgency." At step S5, a scheduling opportunity is given to a packet of a queue assigned to a flow that has the service class "rtPS" and the sub-class "low urgency." At step S6, a scheduling opportunity is given to a packet of a queue assigned to a flow that has the service class "nrtPS" and the sub-class "low urgency." At step S7, a scheduling opportunity is given to a packet of a queue assigned to a flow that has the service class "BE."

Figure 9:
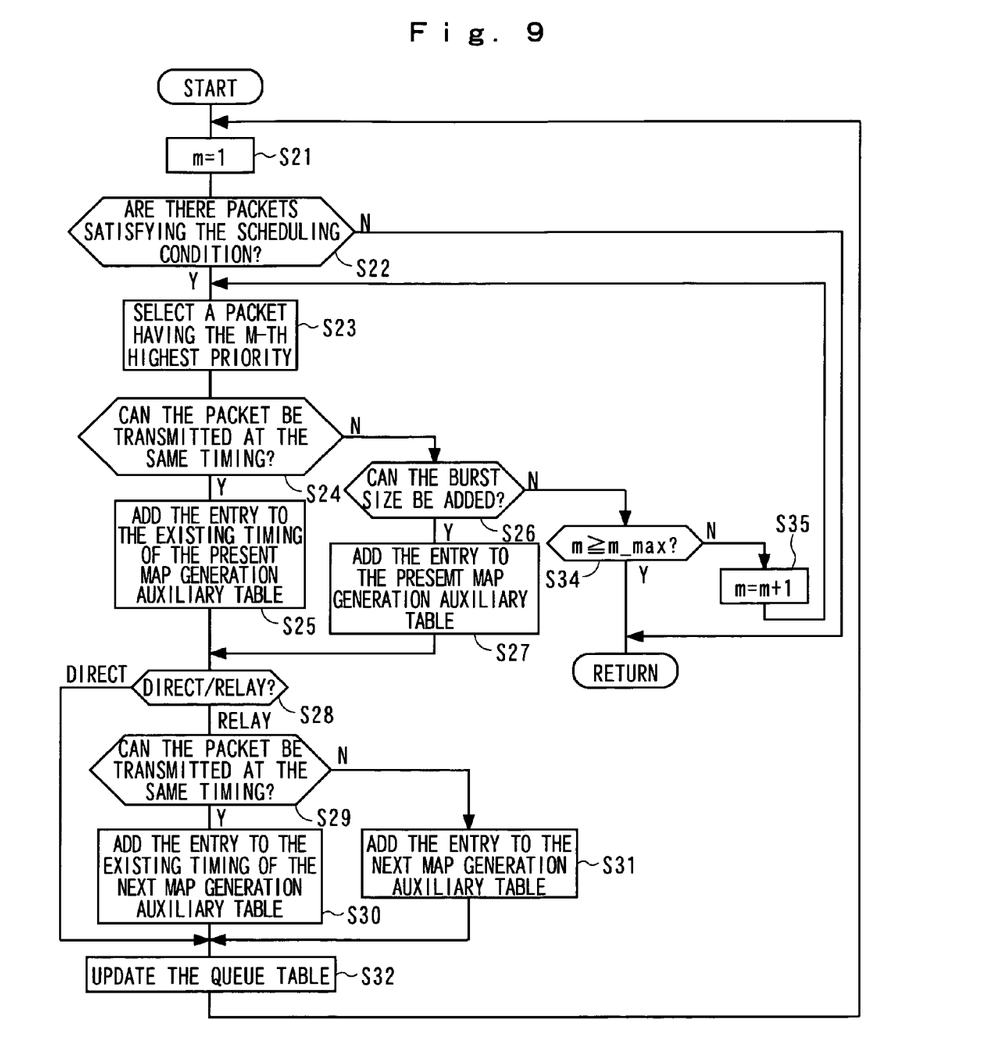
FIG. 9 is a detailed flowchart of a packet scheduling procedure

FIG. 9 is a flowchart detailing a packet-scheduling procedure executed for each service class at steps S1 to S6 mentioned above. It should be noted that a detailed description will be anew at a later time given of a series of operations relative to the present MAP generation auxiliary table (111) executed at steps S24 to S27 of the flowchart and a series of operations relative to the next MAP generation auxiliary table (112) executed at steps S27 to S29 of the flowchart while referring to each table of FIG. 11 to FIG. 13.

At step S21, the initial value "1" is set in a priority variable "m" serving to schedule the head packet of each queue belonging to the same service class according to priority. At step S22, for the head packet of each queue of the present service class (first, "UGS" and "high urgency"), a determination is made as to whether a packet satisfying a scheduling condition is present or absent regardless of whether a communication connection is made directly or is made via a relay station (RS). If at least one packet satisfying the scheduling condition is present, the process proceeds to step S23.

Figure 10:
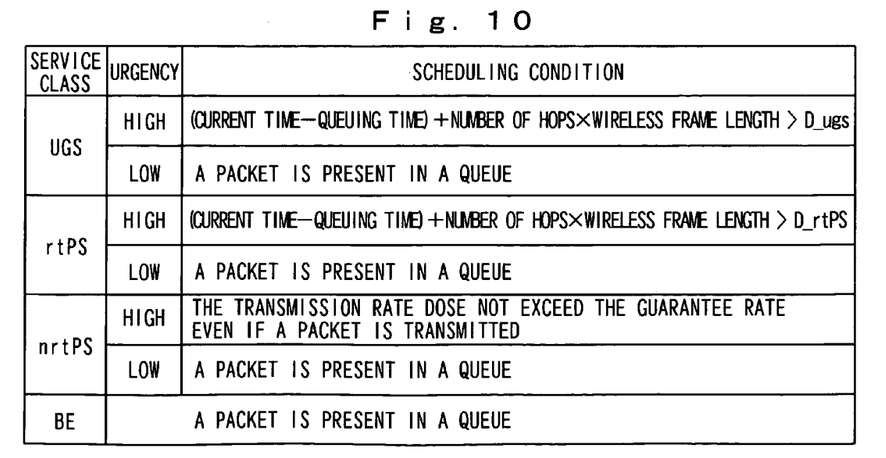
FIG. 10 shows a list of scheduling conditions set for each service class.

FIG. 10 shows a list of scheduling conditions set for each service class, in which transmission opportunities are scheduled only for a head packet that can satisfy the conditions mentioned here.

In this embodiment, concerning a head packet of each queue whose service class is either "UGS" or "rtPS" and whose urgency is "high," basically, if standby time (tc−tq) obtained by subtracting queuing time tq from current time tc exceeds reference standby time ($\Delta t\_ugs$, $\Delta t\_rtpt$) that depends on each service class, it is determined that a scheduling condition is satisfied. However, a relay packet that reaches an SS, which is its destination, from a BS via an RS has more number of transmission by the number of relays (i.e., the number of hops) than a direct packet that directly reaches the SS from the BS without passing through the RS, and hence Latency is caused in accordance with the number of relays.

Therefore, in this embodiment, standby-time correction is performed by adding the product of the number (n−1) of hops and a packet length Lf to the standby time (tc−tq), and a scheduling condition is determined based on the standby time obtained by this correction so that a packet passing through an RS is prioritized over a packet not passing therethrough by the amount of compensation of quality (i.e., Latency) lessened by allowing the packet to pass therethrough, and so that both of the packets are equalized in scheduling opportunity. In other words, in this embodiment, a packet passing through an RS is processed ahead of a packet not passing therethrough by Latency (number of frames) caused by allowing the packet to pass through this RS.

The reference standby time ($\Delta t\_ugs$, $\Delta t\_rtpt$) is set at time in which a lower limit value that enables the maintenance of guaranteed quality is allowed to have a predetermined margin. Therefore, the scheduling of a packet having room for guaranteed quality is postponed even if its service class is "UGS" or "rtPS," and hence only a packet having no room for guaranteed quality is scheduled ahead of the packet having room therefor.

The scheduling condition of a head packet of each queue whose service class is "nrtPS" and whose urgency is "high" is that the traffic rate of a flow does not exceed the guaranteed rate thereof even if the packet is newly scheduled, i.e., that the actual performance does not exceed the guaranteed quality. Concerning a head packet of each queue whose service class is any one of "UGS," "rtPS," and "nrtPS" and whose urgency is "low," and concerning a head packet of each queue whose service class is "BE," it is determined that all packets in queues satisfy the scheduling condition.

Referring again to FIG. 9, at step S23, a head packet that has the m-th highest priority is selected from among packets that satisfy the scheduling condition (herein, "-th" is a suffix used to form ordinal numbers). Therefore, if its service class is either "UGS" or "rtPS," a packet whose standby time that has been corrected is the m-th standby time in duration is selected. If its service class is "nrtPS," a packet whose transmission rate is the m-th transmission rate in order from lowest to highest.

In other words, in this embodiment, as described above with reference to FIG. 6, a queue destined to an SS connected directly to a BS, a queue destined to an SS connected to a BS via one relay station (two hops), a queue destined to an SS connected to a BS via two relay stations (three hops), a queue destined to an SS connected to a BS via three relay stations, and so on are provided for each service class. At step S23, a packet whose standby time is the m-th in duration is selected, or a packet whose transmission rate is the m-th in order from lowest to highest is selected while referring to the standby time or the transmission rate of a head packet of each queue.

At step S24, a determination is made as to whether a packet selected above can be transmitted at the same timing at which other packets that have been scheduled are transmitted. It is determined that the selected packet can be transmitted at the same timing if predetermined conditions, which include the condition that the selected packet differs in destination from the other packets and the condition that interference does not occur, are satisfied. The process then proceeds to step S25. At step S25, an entry of this packet is added to the existing timing of the present MAP generation auxiliary table.

On the other hand, if the packet cannot be transmitted at the same timing, the process proceeds to step S26, where a determination is made as to whether a burst size necessary to transmit the present packet can be added to the frame. If the burst size can be added thereto, the process proceeds to step S27, where an entry thereof is added to the new timing of the present MAP generation auxiliary table 111.

At step S28, a determination is made as to whether the packet selected at the present time is either a direct packet that is transmitted directly from a BS to an SS, which is the destination of the packet, without passing through an RS or a relay packet that is transmitted from a BS to an SS via an RS. If the selected packet is a relay packet, the process proceeds to step S29 in order to further schedule the packet switching performed between the RS and the SS. At step S29, a determination is made as to whether the present packet can be transmitted at the same timing at which other packets that have been scheduled are transmitted, in the same way as above.

If the packet can be transmitted at the same timing, an entry of this packet is added to the existing timing of the next MAP generation auxiliary table 112 at step S30. If the packet cannot be transmitted at the same timing, the process proceeds to step S31, where an entry of the packet is added to the new timing of the next MAP generation auxiliary table. At step S32, the queue table 108 of a queue whose head packet has been scheduled is updated, so that the head packet is updated.

On the other hand, if it is determined at step S26 that the burst size cannot be added thereto, the process proceeds to step S34, where a determination is made as to whether the priority variable m has reached the maximum value m_max. Since it is determined at first that the priority variable m has not yet reached the maximum value m_max, the process proceeds to step S35, where the priority variable m is updated (m=m+1), and the above process is again applied to a head packet having the second highest priority in the same service class.

In other words, if a burst size necessary to transmit a head packet having the m-th highest priority cannot be secured for the frame, reference is made to other head packets having priorities lower than the m-th highest priority. If the packet size is small, and there is a head packet capable of securing a burst size necessary to transmit the packet, then the process returns to step S23 to execute scheduling therefor.

Head packets of queues whose service class is "UGS" and whose sub-class is "high urgency" are successively scheduled in this way, and, if it is determined that no head packet capable of securing the burst size has remained or that there is no head packet satisfying the scheduling condition at step S22, the process proceeds to step S2 of FIG. 8, where the packet scheduling process mentioned above is again applied to the head packet of each queue whose service class is "rtPS" and whose sub-class is "high urgency."

After the packet scheduling process completes being applied to the head packet of each queue whose service class is "nrtPS" and whose sub-class is "high urgency" in the same way as above at step S3, a head packet of a queue whose service class is "UGS" and whose sub-class is "low urgency," a head packet of a queue whose service class is "rtPS" and whose sub-class is "low urgency," a head packet of a queue whose service class is "nrtPS" and whose sub-class is "low urgency," and a head packet of a queue whose service class is "BE" are sequentially scheduled at steps S4, S5, S6, and S7.

Since the scheduling condition determined at step S22 is that "a packet is present in a queue" (see FIG. 10) in the sub-class having "low urgency" in any service class, scheduling is repeatedly performed in the same class as long as a packet is present in a queue. When all packets are completely scheduled, the process shifts to a lower service class, where the same process steps as above are performed.

Next, a description will be given of a method of registering an entry to the present MAP generation auxiliary table 111 executed at steps S24 to S27 of the packet scheduling mentioned above and a method of registering an entry to the next MAP generation auxiliary table 112 executed at steps S27 to S29 with reference to the present MAP generation auxiliary table 111 of FIG. 11 and FIG. 12 and the next MAP generation auxiliary table 112 of FIG. 13.

Management information about each packet whose transmission timing is fixed by a MAP in the present frame is registered in the present MAP generation auxiliary table 111. Likewise, management information about each packet whose transmission timing is fixed by a MAP in the next frame is registered in the next MAP generation auxiliary table 112. Therefore, a packet registered in the present MAP generation auxiliary table 111 is transmitted and received at a timing earlier by one frame than a packet registered in the next MAP generation auxiliary table 112.

Herein, a case in which packets transmitted to the SS11, to the SS12, to the SS22, and to the SS21 from the BS are scheduled in this order in the network structure of FIG. 1 will be described as an example. Additionally, a method of forming the present MAP generation auxiliary table formed with respect to a MAP in the n-th frame will be described on the supposition that the present MAP generation auxiliary table formed with respect to a MAP of the (n−1)-th frame is as shown in FIG. 11A.

The BS recognizes at first that the SS11 is under the control of the RS1 while referring to the SS management table of FIG. 3, and then recognizes that an interference at BS-to-RS1 transmission is the RS2 while further referring to the RS management table of FIG. 4. Herein, the condition (corresponding to step S24 of FIG. 10) for allowing a targeted packet (destined to the SS11) at the present time to be transmitted simultaneously with another packet that has been already scheduled is that a transmitting source (i.e., herein, the BS) is not registered as a "connected station" of a packet that has been scheduled and as an "interference," and is that a destination (i.e., herein, RS1) is not registered in the "connected station" and in the "destination."

Figure 11:
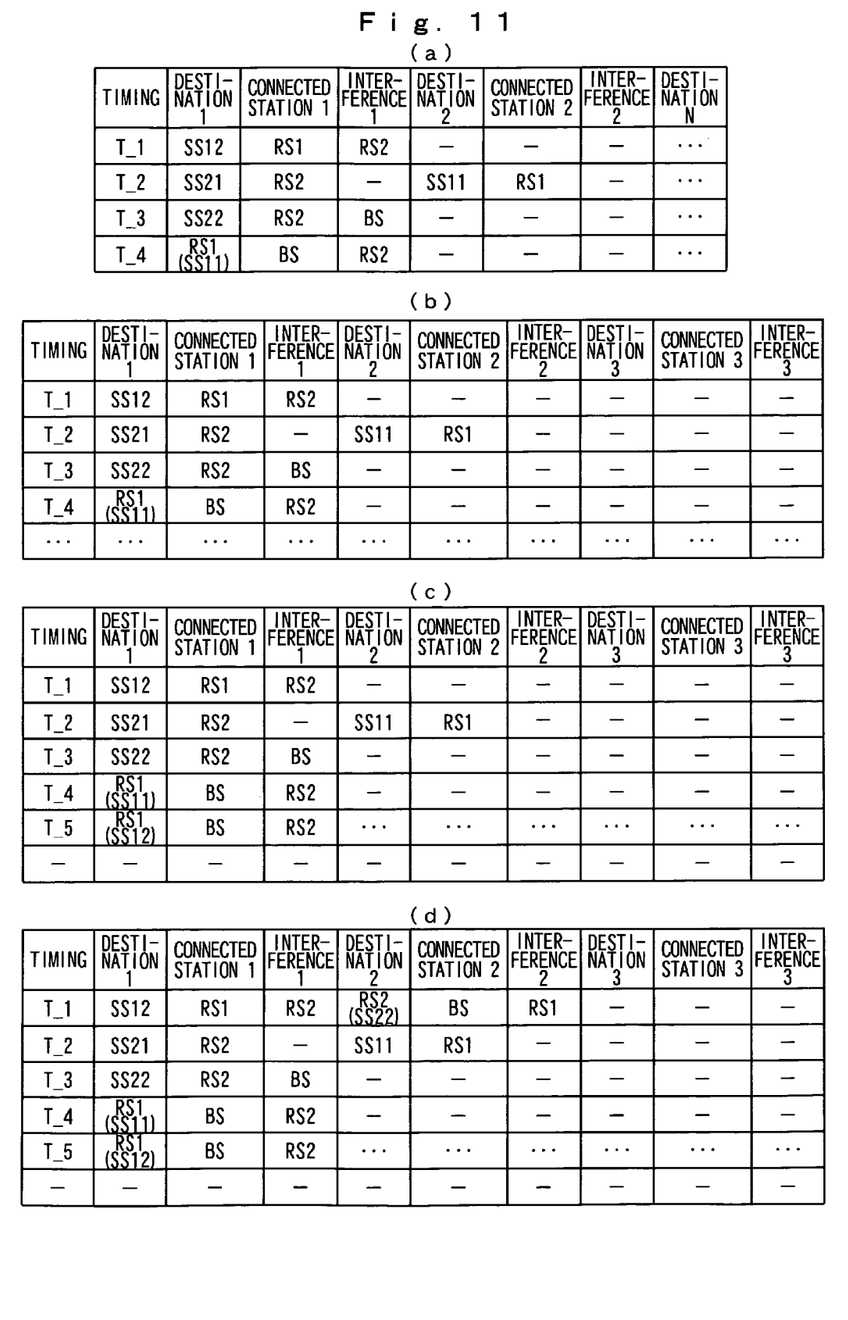
FIG. 11 shows the registered contents of a present MAP generation auxiliary table (Part I).
Figure 12:
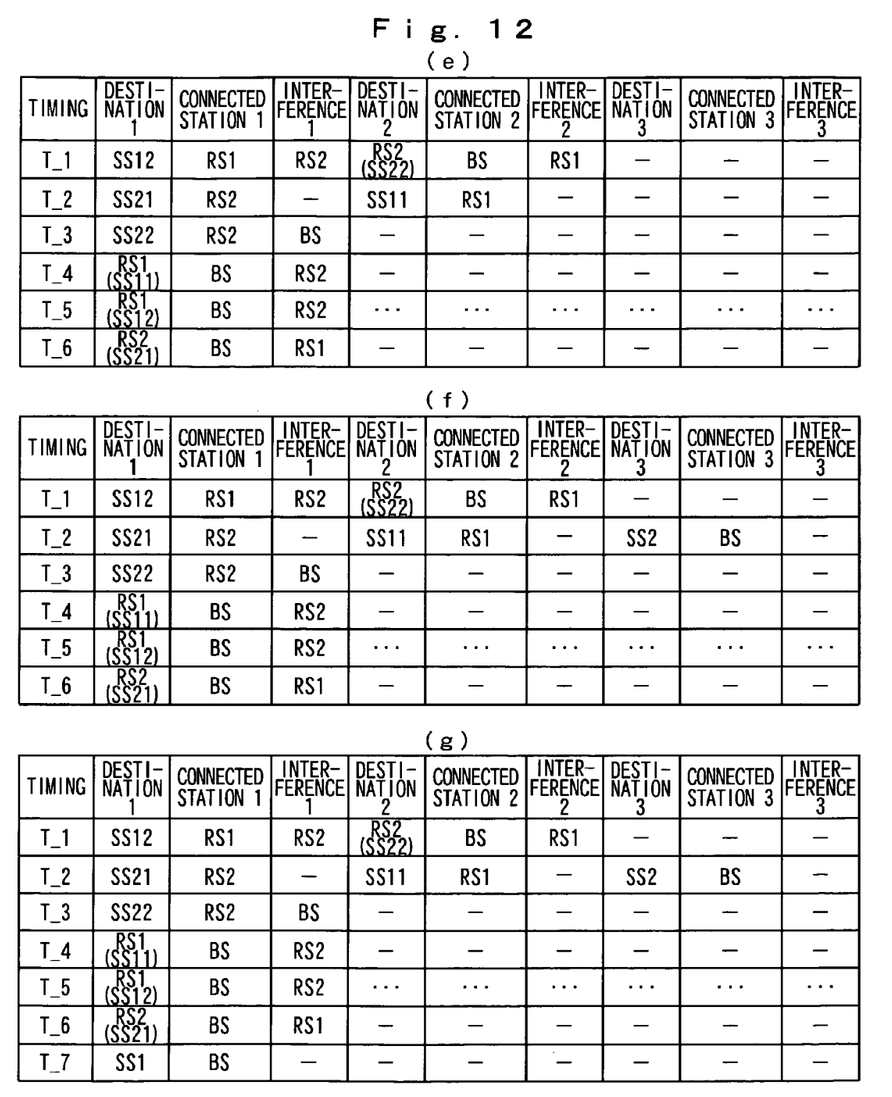
FIG. 12 shows the registered contents of the present MAP generation auxiliary table (Part II).

Referring to the present MAP generation auxiliary table of FIG. 11A, in the "transmission timing T_1" of the table, the RS1, which is a destination, is registered as a connected station, and hence a packet cannot be transmitted at this timing. In the "transmission timing T_2" of the table, the RS1, which is a destination, is registered as a second connected station, and, likewise, a packet cannot be transmitted at this timing. In the "transmission timing T_3" of the table, the BS, which is a transmitting source, is registered as a first interference, and, likewise, a packet cannot be transmitted at this timing. Therefore, it is determined that a targeted packet (destined to the SS11) at the present time cannot be transmitted simultaneously with another packet. As a result, an entry is added to the new transmission timing T_4 of the table as shown in FIG. 11B. Accordingly, "RS1" is registered as its first destination, "BS" is registered as a connected station, and "RS2" is registered as an interference (corresponding to step S27 of FIG. 9).

Figure 13:
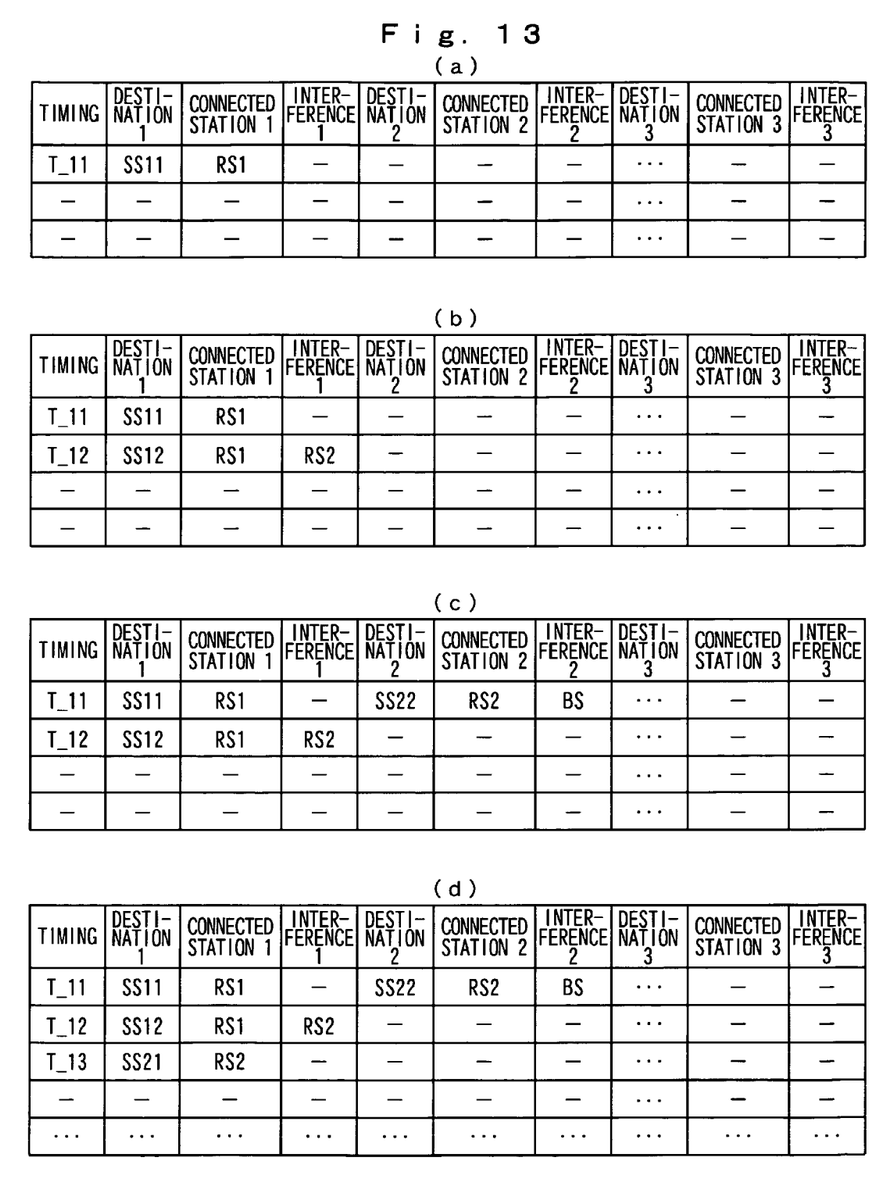
FIG. 13 shows the registered contents of a next MAP generation auxiliary table.

At the same time, in the next MAP generation auxiliary table, an entry is added to the transmission timing T_11 of the table as shown in FIG. 13A (corresponding to step S31 of FIG. 9). Accordingly, "SS11" is registered as its first destination, and "RS1" is registered as a connected station.

Thereafter, paying attention to a packet destined to the SS12, the RS2 is recognized as an interference while referring to the RS management table of FIG. 4 in order to identify the interference at BS-to-RS1 transmission because the SS12 is under the control of the RS1.

Referring to the present MAP generation auxiliary table of FIG. 11B that has been updated, in the "transmission timing T_1" of the table, the RS1, which is a destination, is registered as a connected station, and hence a packet cannot be transmitted at this timing. In the "transmission timing T_2" of the table, the RS1, which is a destination, is registered as a second connected station, and, likewise, a packet cannot be transmitted at this timing. In the "transmission timing T_3" of the table, the BS, which is a transmitting source, is registered as a first interference, and, likewise, a packet cannot be transmitted at this timing. Therefore, it is determined that a targeted packet (destined to the SS12) at the present time cannot be transmitted simultaneously with another packet. As a result, an entry is added to the new transmission timing T_5 of the table as shown in FIG. 11C. Accordingly, "RS1" is registered as its first destination, "BS" is registered as a connected station, and "RS2" is registered as an interference.

At the same time, in the next MAP generation auxiliary table, an entry is added to the transmission timing T_12 of the table as shown in FIG. 13B. Accordingly, "SS12" is registered as its first destination, "RS1" is registered as a connected station, and "RS2" is registered as a first interference.

Thereafter, paying attention to a packet destined to the SS22, the RS1 is recognized as an interference while referring to the RS management table of FIG. 4 in order to identify the interference at BS-to-RS2 transmission because the SS12 is under the control of the RS2.

Referring to the MAP generation auxiliary table of FIG. 11C that has been updated, in the "transmission timing T_1" of the table, the BS, which is a transmitting source, is registered neither as a "connected station" nor as an "interference," and the RS2, which is a destination, is registered neither as a "connected station" nor as a "destination." Therefore, it is determined that a packet addressed from the BS to the RS2 can be transmitted simultaneously with another packet registered in the "transmission timing T_1" of the table at this timing. As a result, as shown in FIG. 11D, in the entry of the "transmission timing T_1," "RS2" is registered as its second destination, "BS" is registered as a connected station, and "RS1" is registered as an interference.

At the same time, scheduling about a packet addressed from the RS2 to the SS22 is added to the next MAP generation auxiliary table. It is determined that the packet addressed from the RS2 to the SS22 can be transmitted simultaneously with a packet addressed from the RS1 to the SS11 in the "transmission timing T_11" of the table, and hence, in the entry of the transmission timing T_11 of the next MAP generation auxiliary table, the SS22 is registered as a second destination, the RS2 is registered as a connected station, and the BS is registered as an interference as shown in FIG. 13C.

Thereafter, paying attention to a packet destined to the SS21, the RS1 is recognized as an interference while referring to the RS management table of FIG. 4 in order to identify the interference at BS-to-RS2 transmission because the SS21 is under the control of the RS2.

Referring to the MAP generation auxiliary table of FIG. 11D that has been updated, in the "transmission timing T_1" of the table, the RS2, which is a destination, is registered as a second connected station, and hence a packet cannot be transmitted at this timing. In the "transmission timing T_2" and the "transmission timing T_3" of the table, the RS2, which is a destination, is registered as a first connected station, and, likewise, a packet cannot be transmitted at this timing. In the "transmission timing T_4" and the "transmission timing T_5" of the table, the BS, which is a transmitting source, is registered as a first connected station, and, likewise, a packet cannot be transmitted at this timing. Therefore, it is determined that a targeted packet (destined to the SS21) at the present time cannot be transmitted simultaneously with another packet. As a result, an entry is added to the new transmission timing T_6 of the table as shown in FIG. 11E. Accordingly, "RS2" is registered as its first destination, "BS" is registered as a connected station, and "RS1" is registered as an interference.

At the same time, in the next MAP generation auxiliary table, an entry is added to the transmission timing T_13 of the table as shown in FIG. 13D. Accordingly, "SS21" is registered as its first destination, and "RS2" is registered as a connected station.

In the above embodiment, scheduling during downlink (DL) from a BS to each SS has been described as an example. However, without being limited to this, the present invention can be applied to scheduling during uplink (UL) from each SS to a BS in the same way as above. In scheduling during SS-to-BS uplink, the BS assigns bands in response to a band request made by each SS. The BS detects a band request, and then records a destination of a memory storing this request together with time at which the request has been received. Thus, a MAP can be produced during uplink by use of the same processing structure as during downlink.

The preferable embodiment of the present invention has been described as above. However, the present invention is not necessarily limited to this embodiment, and can be carried out in variously modified forms within the range not departing from the essentials of the present invention.

What is claimed is:

1. A communication scheduling method for a packet switched wireless multihop system including a wireless base station, a wireless relay station, and a plurality of subscriber stations for allowing the wireless base station and each subscriber station to perform packet switching via at least one relay station, in which same frequency channel is used at each communication direction; at downlink direction from the wireless base station to the wireless relay station and to the subscriber stations, and from the wireless relay station to the subscriber stations, and at uplink direction from the wireless relay station and from the subscriber stations to the wireless base station, and from the subscriber stations to the wireless relay station, the communication scheduling method comprising:

a step of allowing the wireless base station to detect an interference downlink from the wireless base station to the wireless relay station and to the subscriber stations, and from the wireless relay station to the subscriber stations;

a step of allowing the wireless base station to detect an interference uplink from the wireless relay station and from the subscriber stations to the wireless base station and from the subscriber stations to the wireless relay station;

a step of allowing the wireless base station to, based on the detected interference information, form a communication schedule, for communicating on the same frequency channel between the wireless base station and the wireless relay station, between the wireless relay station and the subscriber station and between the wireless base station and the subscriber station, in which a packet is scheduled to be transmitted or received at the same timing as those of other packets as long as predefined conditions, which include a condition that the packet differs in its destination from the other packets and a condition that the packet does not cause interference, are satisfied, and the packet is scheduled to be transmitted or received at the new timing if the packet does not achieve said predefined conditions;

a step of transmitting a frame in which a MAP of the communication schedule for communicating on the same frequency channel has been registered from the wireless base station to the wireless relay station;

a step of allowing the wireless relay station to receive the frame in which the communication schedule for communicating on the same frequency channel has been registered; and a step of transmitting the frame in which the MAP of the communication schedule for communicating on the same frequency channel has been registered from the wireless relay station to the subscriber station.

2. The communication scheduling method according to claim 1, wherein the step of allowing the wireless base station to detect the interference at downlink includes:

a step of allowing each subscriber station to receive a broadcast message transmitted from the wireless base station and from the wireless relay station;

a step of allowing each subscriber station to recognize other wireless base stations and other wireless relay stations as interferences excluding the wireless base station or the wireless relay station to which each subscriber station is connected, among transmitting sources from which broadcast messages have been transmitted and received; and a step of allowing the subscriber station to send interference information including ID about the interferences to the wireless base station.

3. The communication scheduling method according to claim 1, wherein the step of allowing the wireless base station to detect the interference at uplink includes:

a step of allowing the wireless relay station to receive messages transmitted from the subscriber stations;

a step of allowing the wireless relay station to recognize the subscriber stations whose messages have been received by the wireless relay station and that are not under the control of the wireless relay station as interferences; and a step of allowing the wireless relay station to send interference information including ID of the interferences to the wireless base station.

4. The communication scheduling method according to claim 1, further comprising:

a step of allowing the wireless base station to form a MAP that specifies a communication timing between the wireless base station and the relay station and a communication timing between the relay station and the subscriber station;

a step of allowing the wireless base station and the wireless relay station to transmit and receive a frame including the MAP and a packet whose communication timing is specified by the MAP; and a step of allowing the wireless relay station and the subscriber station to transmit and receive a frame including the MAP and a packet whose communication timing is specified by the MAP.

5. The communication scheduling method according to claim 1, further comprising:

a step of allowing the wireless base station to, based on the received interference, form a communication schedule between the wireless relay stations; and a step of transmitting and receiving a frame in which a packet and a MAP of the communication schedule have been registered between the wireless relay stations.

* * * * *